Feb. 17, 1959  C. R. LUNN  2,873,957
CARBURETOR FLOAT MECHANISM
Filed March 21, 1957
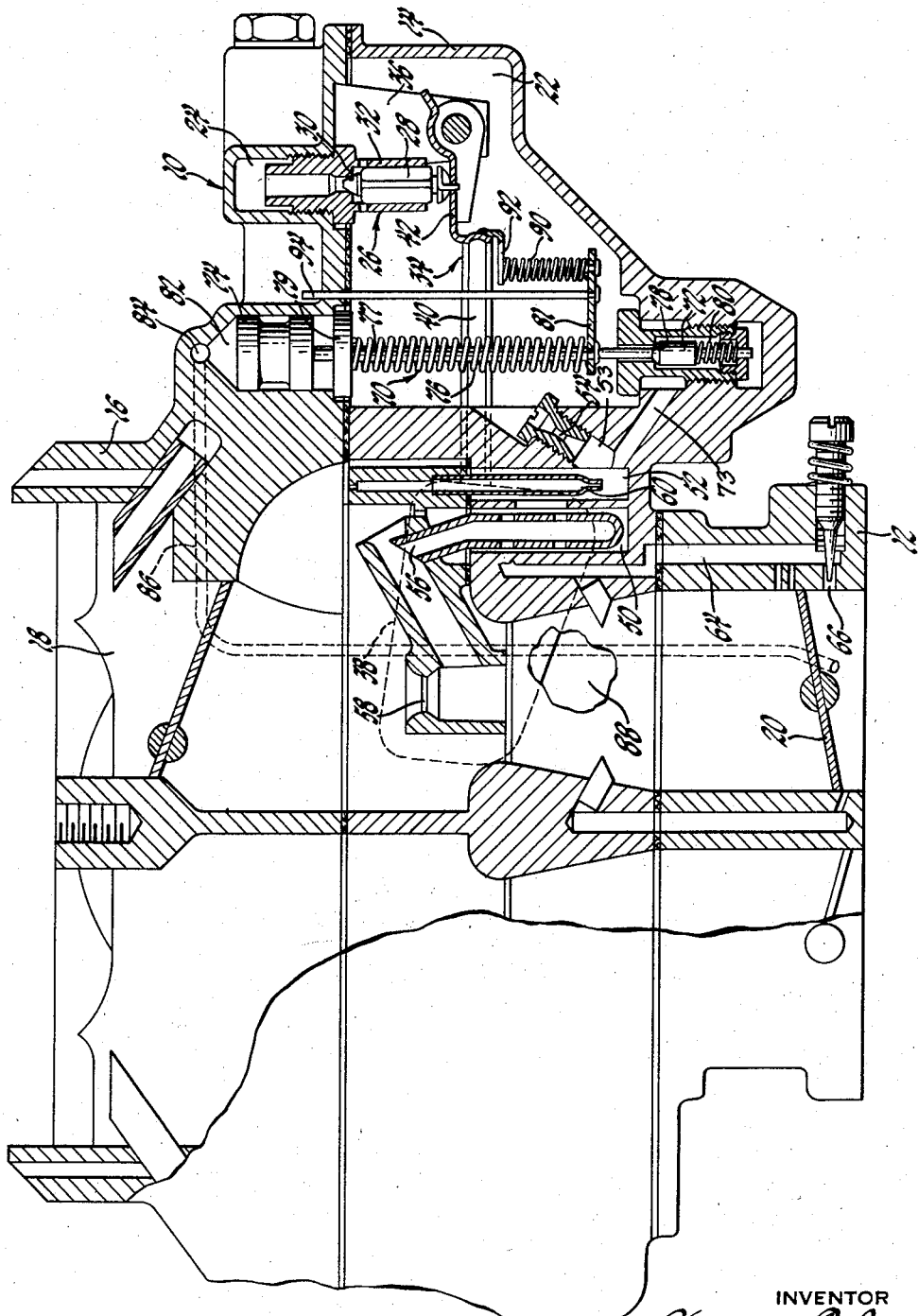
INVENTOR
Clarence R. Lunn
BY
R. T. Barnard

United States Patent Office 2,873,957
Patented Feb. 17, 1959

2,873,957

CARBURETOR FLOAT MECHANISM

Clarence R. Lunn, Lathrup Village, Mich., assignor to General Motors Corporation, Detroit, Mich., a corporation of Delaware Application March 21, 1957, Serial No. 647,528

5 Claims. (Cl. 261—69)

The present device relates to a carburetor float mechanism and more particularly one in which the float buoyancy is variable in accordance with certain operating conditions of the engine.

A problem with carburetor float controlled fuel feeding mechanisms has been that the actuation is unwantedly variable with certain transient vehicle operating conditions such as turning and accelerating. In other words, when a vehicle is cornering or accelerating the fluid shifts from one side to the other within the float bowl chamber and in so doing changes the position of the float so as not to reflect the actual needs of the fuel system. For example, when the vehicle is going around a corner the fuel may shift to one side thereby increasing the buoyant force acting on the float to shut off the fuel inlet valve and thereby starving the carburetor causing the engine to stutter or fail momentarily for want of fuel.

This malfunctioning of the float mechanism has been aggravated with newer type carburetors in which the depth of the float bowl chamber has been decreased in order to reduce the vertical height of the carburetor consistent with the lower vehicle profiles which are being utilized on present day automobiles. With the shallower type float bowl chambers the action of the float mechanism becomes more critical in that the total vertical movement of the float is considerably reduced. It is, therefore, imperative that the float mechanism respond accurately to the needs of the engine and not be unduly shifted by transient operating conditions. Attempts have been made to solve this problem by combining spring mechanisms with the float member in such a way as to increase the buoyancy of the float mechanism. However, such spring devices have themselves created certain problems which are equally as undesirable as the original problem which was sought to be solved.

It has been found with the type of spring mechanisms utilized heretofore to increase the buoyancy of the float mechanism that on acceleration or high speed cornering such mechanisms enhanced the tendency of the float to shut off the fuel inlet valve at a time when large quantities of fuel are required.

It is the purpose of the present invention to provide means which under normal operating conditions increases the buoyancy of the float mechanism to avoid flooding of the float bowl chamber. In the present invention the buoyancy increasing means is, however, made responsive to the load on the engine and rendered inoperative under conditions of high power demand. Under such conditions the float mechanism is relatively less buoyant which tends to maintain the fuel inlet valve in an open position to provide the requisite quantity of fuel for high power operation of the engine.

One way of achieving the object of the present invention has been to combine a float buoyancy increasing spring device with the fuel power piston, the latter which is operative under high engine load conditions to render said device inoperative.

The details of the present invention as well as other objects and advantages will be apparent from a perusal of a detailed description which follows.

The drawing is a partially sectioned view of a carburetor embodying the subject invention.

The carburetor 10 on which the subject invention has been embodied is selected merely for illustrative purposes since the present device is adaptable for use with any type of carburetor. Carburetor 10 includes a throttle casing 12, a float bowl casing 14 and a cover casing 16. An induction passage 18 is formed through the casing members and the combustible charge flow controlled by a throttle valve 20 disposed in the throttle casing 12. A fuel chamber 22 is formed in the float bowl casing 14 and is adapted to receive fuel from an inlet passage 24 controlled by an inlet valve mechanism indicated generally at 26. The inlet passage 24 and the inlet valve 26 are formed in or supported from the float bowl cover 12. The valve mechanism 26 may be of any conventional type but in general includes a slidable valve member 28 which is adapted to coact with a valve seat 30 formed in the valve body 32 to control the flow of fuel into the fuel chamber 22 in accordance with the axial position of the member 28.

A float mechanism indicated generally at 34 is pivoted on a bracket 36 supported from the cover 12 and includes the float 38 supported from the pivoted arm 40. Arm 40 includes a portion 42 adapted to engage the slidable valve member 28 and move the latter axially within the valve casing 32 in accordance with the position of the fuel level controlled float member 38. As the fuel level in the chamber 22 is reduced the float drops opening the valve mechanism 26 to admit more fuel into the fuel chamber until such time as the fuel reaches the proper level to shut off the valve.

As already noted, with the vehicle accelerating or taking corners at high speeds the fluid within the chamber 22 will shift and so actuate the float mechanism as not to reflect the actual need of the fuel system.

Main and idling fuel wells 50 and 52 are formed in the float bowl casing 14 and are in communication with each other and with the fuel chamber 22 through a passage 53 including a metering orifice 54. A main fuel nozzle 56 projects within the main fuel well 50 and communicates with the venturi 58 so that the air flowing through the induction passage will draw fuel from the main fuel well into the induction passage in proportion to the velocity of air flow through the venturi. Similarly the idling fuel well 52 includes an idle fuel nozzle 60 which communicates through passage 64 with the induction passage 18 through an idling orifice 66 disposed posteriorly to the throttle valve 20. The idling fuel flow takes place only when the throttle 20 is closed as shown.

While the main fuel well 50 in combination with the metering orifice 54 is sufficient to provide fuel for normal operating conditions it is inadequate to supply sufficient fuel under conditions of high power demands. Accordingly, it is normal practice in current carburetors to provide a power mechanism indicated generally at 70 which is adapted to open a fuel valve 72 to permit additional fuel to flow to the main metering well 50 through a passage 73. The power mechanism 70 includes a vacuum piston 74 disposed in a chamber formed in the cover 12 and which piston is biased in a downward position by a spring member 76, which surrounds piston rod 77. Spring 76 seats at one end upon a washer 79 mounted in cover 12 and biases at its other end against a washer 81 fixed to rod 77. Rod 77 is adapted to engage valve member 72. Valve member 72 is normally biased against its seat 78 by a spring member 80. Piston chamber 82 is communicated through a port 84 with a vacuum passage 86 connecting with induction passage 18 posteriorly of throttle valve 20 to transmit manifold vacuum to piston 74. Under normal operating conditions the manifold vacuum in passage 86 is sufficient to maintain the piston 74 in an upward position against the force of spring 76 and in so doing permits the spring 80 to close valve 72. In this way fuel is supplied to float chamber 22 by metering orifice 54 only. When, however, the load on the engine is increased sufficiently to require additional fuel the manifold vacuum in chamber 82 drops to a value which enables vacuum piston spring 76 to move the piston downwardly unseating valve 72 and admitting additional fuel to the main metering well 50 to meet the additional demand on the engine. The mechanism as thus far described is conventional in carburetors as presently manufactured.

As already suggested the present day use of shallower float bowl chambers has resulted in a relative decrease in the buoyant force available to act upon the float mechanism, for this reason additional spring 90 has been provided to supplement the buoyancy of float 38. The washer 81 is sufficiently enlarged to provide a seat for spring 90 which is suitably fixed thereto. The other end of spring 90 is adapted to bias against an arm 92 fixed on the float bowl arm 40. Thus, under normal operating conditions with the power piston 74 in the position shown in the drawings, the spring member 90 will exert an additional buoyant force on the float mechanism 34 which offsets the reduced buoyant fluid force acting on the float 38 due to the use of a shallower float bowl 88.

By mounting the spring 90 on a portion of the power mechanism 70 it will be seen that under high load conditions the spring member will be moved out of engagement with arm 92 thereby eliminating its supplemental buoyant action on the float bowl mechanism. This more closely corresponds to the needs of the engine which under high speed acceleration or cornering conditions must be assured of adequate fuel in the float bowl chamber 22. To illustrate, under accelerating conditions the fuel in float bowl chamber 22 would tend to move to the rear of the chamber, the right as viewed in the drawing, which had the effect of increasing the buoyant force acting on the float 38 and thereby tending to shut off the inlet valve 26 resulting in a starving of the engine for fuel. This increased buoyant effect is, however, compensated for in the present mechanism by the elimination of the buoyant action of spring 90 which under the same accelerating or high load conditions is moved downwardly with the power piston 74 so as to be out of engagement with the arm 92 mounted on float arm 40. Thus, the float valve mechanism will continue to provide fuel to the float bowl chamber in accordance with the needs of the engine notwithstanding high speed acceleration or cornering.

To insure that the spring 90 will not be moved out of operative engagement with the float arm 92 by possible rotation of the power piston mechanism 70 a rod member 94 is fixed to the washer 81 and is adapted to project through a suitable hole in the cover 12. In this way supplemental spring 90 will always be aligned with the float arm 92.

I claim:

1. A carburetor mechanism for an internal combustion engine comprising a fuel chamber, an induction passage, first passage means for supplying fuel to the fuel chamber, a first valve mechanism for controlling the flow of fuel from said passage to said chamber, a float mechanism in said fuel chamber for controlling the actuation of said valve in accordance with the level of fuel in the float bowl chamber, second passage means for conveying fuel from the float chamber to the induction passage, a second valve for increasing the flow of fuel through said second fuel passage means, means normally biasing the second valve in a closed position, a manifold vacuum responsive member adapted to unseat the second valve, spring means operatively connected to said member and adapted to engage and increase the buoyancy of the float mechanism under normal engine operating conditions, and means for shifting said member to open the second valve and render the spring means inoperative upon a drop in manifold vacuum.

2. A carburetor mechanism as set forth in claim 1 in which said first and second valve mechanism and said spring means are disposed in said fuel chamber.

3. A carburetor mechanism for an internal combustion engine comprising a fuel chamber, an induction passage, first passage means for supplying fuel to the fuel chamber, a first valve mechanism for controlling the flow of fuel from said passage to said chamber, a float mechanism in said fuel chamber for controlling the actuation of said valve in accordance with the level of fuel in the float bowl chamber, second passage means for conveying fuel from the float chamber to the induction passage, a second valve for increasing the flow of fuel through said second fuel passage means, means normally biasing the second valve in a closed position, a manifold vacuum responsive member adapted to unseat the second valve, spring means operatively connected to said member and adapted to engage and increase the buoyancy of the float mechanism under normal engine operating conditions, means for shifting said member to open the second valve and render the spring means inoperative upon a drop in manifold vacuum, and means for maintaining said spring means in operative alignment with said float mechanism.

4. A carburetor mechanism for an internal combustion engine comprising a fuel chamber, an induction passage, first passage means for conveying fuel from the fuel chamber to the induction passage, second passage means for supplying fuel to the fuel chamber, a valve mechanism for controlling the flow of fuel from said second passage means to said chamber, a float mechanism including a float arm for controlling the actuation of said valve in accordance with the level of fuel in the float bowl chamber, a first spring means adapted to engage said arm for increasing the buoyancy of the float mechanism, manifold vacuum responsive means normally maintaining said spring means in engagement with said arm, and a second spring means for shifting the first spring means out of engagement with said arm upon a drop in manifold vacuum.

5. A carburetor mechanism for an internal combustion engine comprising a fuel chamber, an induction passage, first passage means for conveying fuel from the fuel chamber to the induction passage, second passage means for supplying fuel to the fuel chamber, a valve mechanism for controlling the flow of fuel from said second passage means to said chamber, a float mechanism for controlling the actuation of said valve in accordance with the level of fuel in the float bowl chamber, engine load responsive means associated with said fuel chamber, and a resilient connection between the load responsive means and the float mechanism enabling the resiliency of said connection to be varied with variations in engine load.

References Cited in the file of this patent

UNITED STATES PATENTS

| 2,340,876 | Gilbert | Feb. 8, 1944 |
| 2,448,709 | Gilbert | Sept. 7, 1948 |
| 2,692,766 | Carlson et al. | Oct. 26, 1954 |